US012783736B2

(12) United States Patent
Kim et al.

(10) Patent No.: US 12,783,736 B2
(45) Date of Patent: Nov. 3, 2026

(54) METHOD FOR SECURING MARKETPLACE IN CLOUD AND APPARATUS THEREOF

(71) Applicant: SAMSUNG SDS CO., LTD., Seoul (KR)

(72) Inventors: Eunkyung Kim, Seoul (KR); Jihoon Cho, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 126 days.

(21) Appl. No.: 18/511,928

(22) Filed: Nov. 16, 2023

(65) Prior Publication Data

US 2024/0184928 A1 Jun. 6, 2024

(30) Foreign Application Priority Data

Dec. 2, 2022 (KR) ........................ 10-2022-0166865

(51) Int. Cl.

*G06F 21/64* (2013.01)
*G06F 21/33* (2013.01)
*G06F 21/53* (2013.01)

(52) U.S. Cl.

CPC .............. *G06F 21/64* (2013.01); *G06F 21/33* (2013.01); *G06F 21/53* (2013.01)

(58) Field of Classification Search

CPC .......... G06F 21/64; G06F 21/33; G06F 21/53; G06F 9/45558; G06F 2009/45562; G06F 2009/45587; G06F 21/57; G06Q 30/018; G06Q 30/0601; H04L 63/08; H04L 63/0823; H04L 9/3247

See application file for complete search history.

(56) References Cited

U.S. PATENT DOCUMENTS

| | | | | |
|---|---|---|---|---|
| 9,158,909 | B2 | 10/2015 | Doane et al. | |
| 9,471,354 | B1 * | 10/2016 | Schweitzer ......... | G06F 9/45504 |
| 9,838,430 | B1 * | 12/2017 | Roth .................. | G06Q 30/0601 |
| 2012/0266252 | A1 * | 10/2012 | Spiers ................... | H04L 9/3247 726/26 |
| 2014/0096135 | A1 * | 4/2014 | Kundu .................... | G06F 9/455 718/1 |
| 2015/0254451 | A1 * | 9/2015 | Doane ..................... | G06F 21/44 726/1 |
| 2017/0279781 | A1 | 9/2017 | Lie, Jr. et al. | |
| 2020/0326972 | A1 | 10/2020 | Doane et al. | |
| 2020/0409740 | A1 * | 12/2020 | Li ......................... | G06F 9/5077 |

FOREIGN PATENT DOCUMENTS

JP 2019-160133 A 9/2019

OTHER PUBLICATIONS

European search report issued on Jan. 5, 2024, in counterpart European Patent Application No. 23205965.9 (4 pages).

* cited by examiner

*Primary Examiner* — Trong H Nguyen
(74) *Attorney, Agent, or Firm* — NSIP Law

(57) ABSTRACT

Disclosed is a marketplace security method performed by a cloud service provider (CSP), and the method includes an operation of downloading a virtual machine (VM) image selected by a cloud service customer from the marketplace into a cloud space of the corresponding cloud service customer, an operation of obtaining an electronic signature associated with the downloaded VM image in response to an operation request from the cloud service customer, an operation of verifying the obtained electronic signature, and an operation of determining, based on a verification result, whether to operate a VM instance corresponding to the downloaded VM image.

12 Claims, 8 Drawing Sheets

<VM SERVICE PROVIDER AUTHENTICATION PROCESS>

<VM IMAGE VERIFICATION PROCESS AT POINT IN TIME OF REGISTRATION>

<VM IMAGE VERIFICATION PROCESS AT POINT IN TIME OF OPERATION>

METHOD FOR SECURING MARKETPLACE IN CLOUD AND APPARATUS THEREOF

CROSS-REFERENCE TO RELATED APPLICATIONS

This application is based on and claims priority under 35 U.S.C. 119 to Korean Patent Application No. 10-2022-0166865, filed on Dec. 2, 2022, in the Korean Intellectual Property Office, the disclosure of which is herein incorporated by reference in its entirety.

BACKGROUND OF THE INVENTION

1. Field

The disclosure relates to a marketplace security technology provided by a cloud service provider and, more particularly, to a method and apparatus for enabling a cloud service customer to safely use a virtual machine image registered with a marketplace.

2. Description of Related Art

A marketplace has the meaning of a market, and the concept thereof in the cloud refers to a space for enabling users to conveniently install and use various types of things in a virtual machine (VM) or to trade a solution provided in the form of a VM. As a more comprehensive example, there may be a concept such as Google play store, Apple app store, or the like used in a mobile terminal.

Currently, a few large enterprises that provide cloud services are providing marketplace services. Cloud service customers are capable of purchasing various solutions (i.e., programs) via those marketplace services, and a distribution method for the corresponding solutions is mainly provided in the form of a VM. Marketplaces are being developed to a form in which a cloud service provider (CSP) registers its solution with a marketplace and provides the same, in addition to a general form of registering only a solution of a foreign company or an individual with a marketplace.

As the number of marketplace services that use the cloud is gradually increased, there is a desire for a security technology that enables a cloud service customer to safely use VM images provided from various vendors (i.e., VM service providers). That is, in a process in which a VM service provider registers a VM image with a marketplace or a process in which a cloud service customer downloads a VM image registered with the marketplace and operates a VM instance, there may be a desire for a method of identifying whether the corresponding VM image is forged/falsified.

SUMMARY

An aspect of the disclosure is to overcome the above-described drawback and other drawbacks. Another aspect of the disclosure is to provide a method and apparatus for identifying whether a VM image is forged/falsified at the point in time at which a VM service provider registers the corresponding VM image with a marketplace of a cloud service provider (CSP).

Another aspect of the disclosure is to provide a method and apparatus for identifying whether a VM image is forged/falsified at the point in time at which a cloud service customer operates the corresponding VM image downloaded from a marketplace of a cloud service provider (CSP).

According to an aspect of the disclosure to achieve the above-mentioned or another objective, there is provide a marketplace security method implemented by a cloud service provider (CSP), the method including an operation of receiving a message for requesting registration of a virtual machine (VM) image from a VM service provider, an operation of obtaining an electronic signature associated with the VM image, an operation of verifying the obtained electronic signature, and an operation of determining, based on a verification result, whether to register the VM image with the marketplace.

According to another aspect of the disclosure, there is provided a marketplace security apparatus including one or more processors and a memory, wherein the one or more processors are configured to receive a message that requests registration of a virtual machine (VM) image from a VM service provider, to obtain an electronic signature associated with the VM image, to verify the obtained electronic signature, and to determine, based on a verification result, whether to register the VM image with the marketplace.

According to another aspect of the disclosure, there is provided a marketplace security method implemented by a cloud service provider (CSP), the method including an operation of downloading a virtual machine (VM) image selected by a cloud service customer from the marketplace into a cloud space of the corresponding cloud service customer, an operation of obtaining an electronic signature associated with the downloaded VM image in response to an operation request from the cloud service customer, an operation of verifying the obtained electronic signature, and an operation of determining, based on a verification result, whether to operate a VM instance corresponding to the downloaded VM image.

According to another aspect of the disclosure, there is provided a marketplace security apparatus including one or more processors and a memory, wherein the one or more processors are configured to download a virtual machine (VM) image selected by a cloud service customer from a marketplace to a cloud space of the corresponding cloud service customer, to obtain an electronic signature associated with the downloaded VM image in response to an operation request from the cloud service customer, to verify the obtained electronic signature, and to determine, based on a verification result, whether to operate a VM instance corresponding to the downloaded VM image.

BRIEF DESCRIPTION OF THE DRAWINGS

For a better understanding of the disclosure, embodiments and technical features of the disclosure will be described with reference to the following description taken in conjunction with the accompanying drawings, in which.

DETAILED DESCRIPTION

Figure 1:
FIG. 1 is a diagram illustrating the timeline of a marketplace service provided by a cloud service provider (CSP)

Hereinafter, reference will now be made to embodiments, which are illustrated in the accompanying drawings, wherein like reference numerals may refer to like component elements throughout and duplicated description thereof will be omitted. An ending word used for a component element, such as "module" and "unit", is assigned or used for ease of drafting the specifications, and may not have a distinguishing meaning or role. In this instance, the term "unit" used in the disclosure may refer to a software component element or a hardware component element such as a FPGA or an ASIC, and "unit" may perform some functions. However, "unit" is not limited to software or hardware. "unit" may be configured to be contained in an addressable storage medium, or may be configured to reproduce one or more processors. Therefore, for example, "unit" may include component elements such as software component elements, object-oriented software component elements, class component elements, and task component elements, processes, functions, attributes, procedures, sub-routines, segments of a program code, drivers, firmware, microcode, circuit, data, database, data structures, tables, arrays, and variables. A function provided in the component elements and "units" may be implemented by coupling the functions of a smaller number of component elements and "units" or may be implemented by distributing the function to additional component elements and "units".

In addition, when it is determined that detailed descriptions related to a well-known related technical art make the subject matter of the embodiments disclosed in the specification unclear, the detailed descriptions will be omitted herein. In addition, the attached drawings are merely to help understanding of embodiments disclosed in the specification, and it should be understood that the attached drawings do not limit the technical idea disclosed in the specification, but to the contrary, it should be construed that all modifications, equivalents, and alternatives falling within the scope of the embodiments are included.

The disclosure is to provide a method and apparatus for identifying whether a VM image is forged/falsified at the point in time at which a VM service provider registers the corresponding VM image with a marketplace of a cloud service provider (CSP). In addition, the disclosure is to provide a method and apparatus for identifying whether a VM image is forged/falsified at the point in time at which a cloud service customer operates a VM image downloaded from a marketplace of a cloud service provider (CSP). The disclosure is applicable to all service provides capable of providing a marketplace, in addition to a cloud service provider (CSP).

Hereinafter, various embodiments of the disclosure will be described in detail with reference to drawings.

FIG. 1 is a diagram illustrating the timeline of a marketplace service provided by a cloud service provider (CSP).

As illustrated in FIG. 1, a cloud service provider (CSP) may interoperate with a VM service provider and provide a marketplace service to a cloud service customer. To this end, the VM service provider may sequentially perform a process of requesting registration of a vender with a marketplace of the cloud service provider (CSP), and a process of registering its VM image with the marketplace. The cloud service customer may perform a process of selecting and downloading at least one of a plurality of VM images registered with the marketplace of the cloud service provider (CSP), and operating a VM instance.

In case that the VM service provider requests registration of a vendor, the cloud service provider (CSP) may perform a procedure of authenticating the corresponding VM service provider by using an authentication certificate issued from a certificate authority (CA). The detailed description thereof will be provided with reference to FIGS. 2A and 2B.

In case that the VM service provider requests registration of a VM image, the cloud service provider (CSP) may perform a procedure of identifying whether the VM image provided from the corresponding VM service provider is forged/falsified by using an authentication certificate and/or an electronic signature. The detailed description thereof will be provided with reference to FIGS. 3A and 3B.

In case that the cloud service customer requests operation of a VM instance, the cloud service provider (CSP) may perform a procedure of identifying whether the VM image downloaded from the marketplace is forged/falsified by using an authentication certificate and/or an electronic signature. The detailed description thereof will be provided with reference to FIGS. 4A and 4B.

Figure 2A:
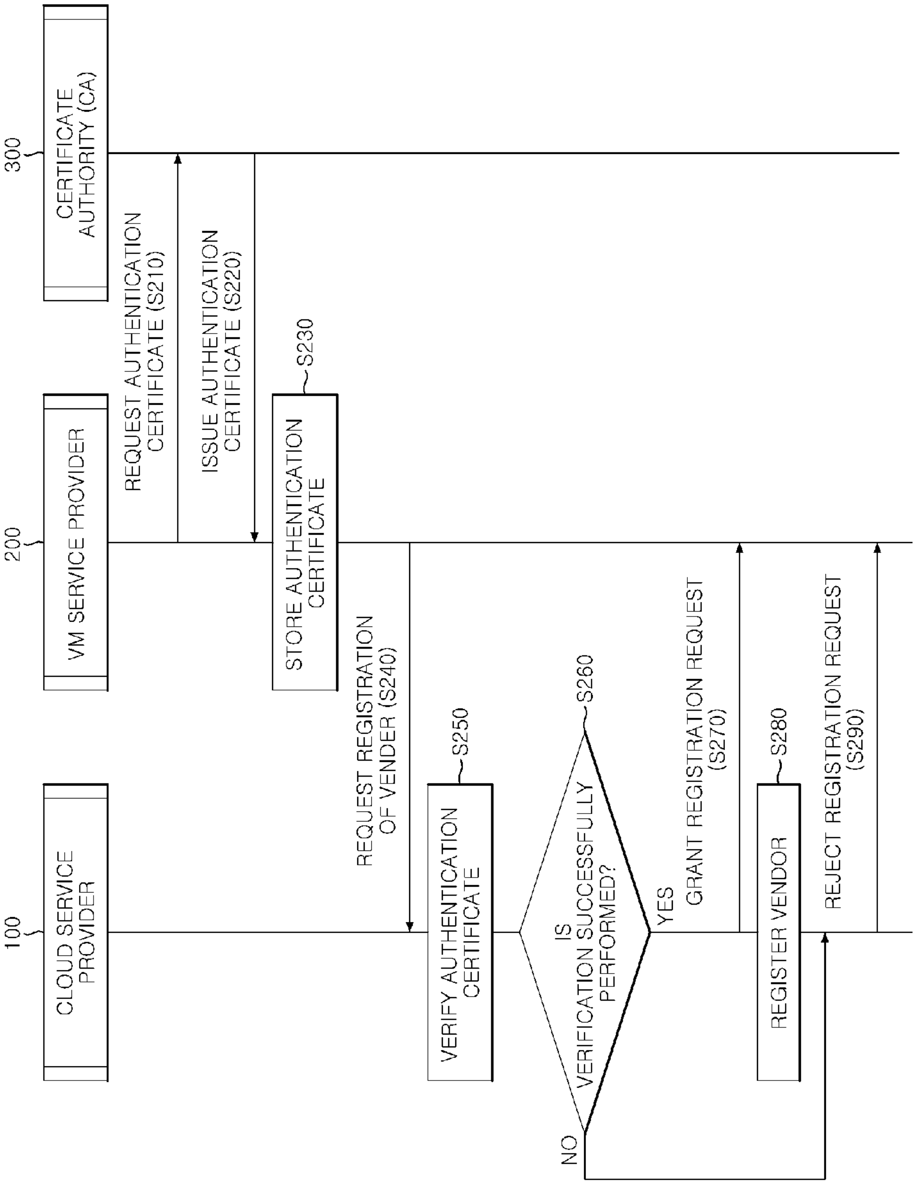
FIG. 2A is a flowchart illustrating a process of authenticating a VM service provider in the case of registration of a vendor.
Figure 2B:
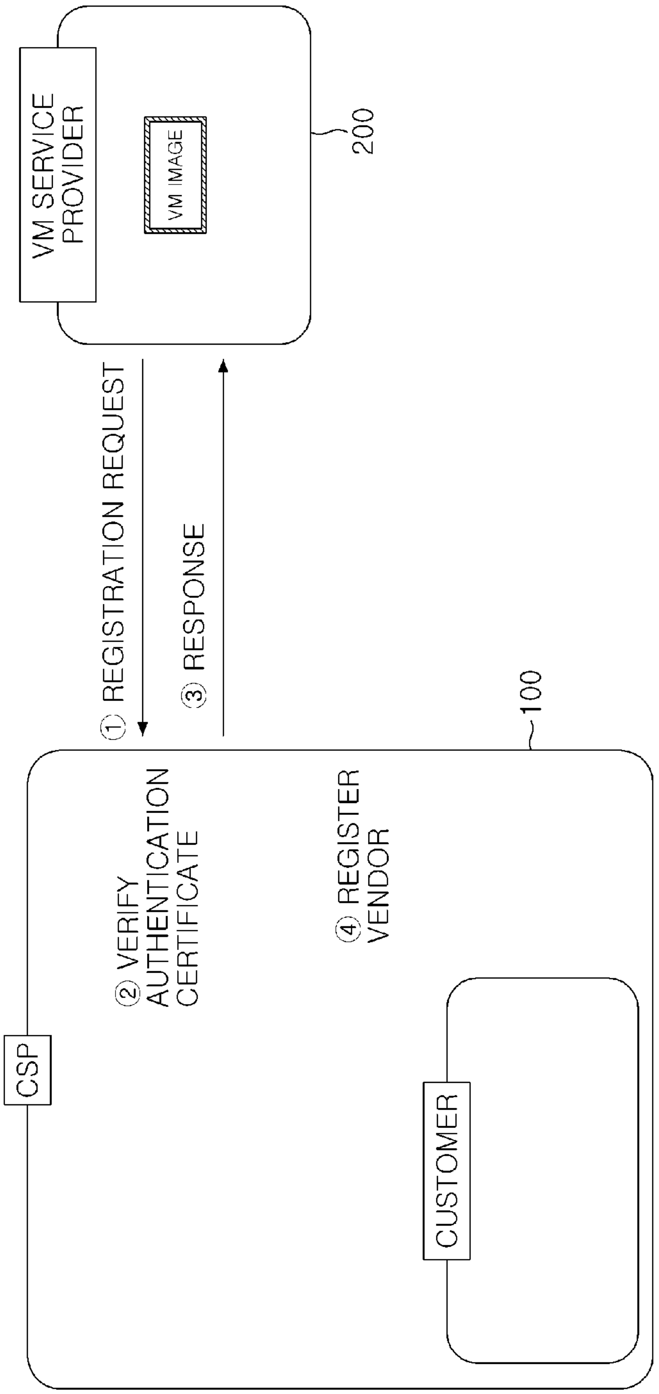
FIG. 2B is a diagram to which reference is made, in order to describe the authentication process of FIG. 2A.

FIG. 2A is a flowchart illustrating a process of authenticating a VM service provider in the case of registration of a vendor, and FIG. 2B is a diagram to which reference is made in order to describe the authentication process of FIG. 2A. A VM service provider (vendor) authentication process according to an embodiment may be performed by a marketplace security apparatus (not illustrated) in the cloud service provider 100. The marketplace security apparatus may operate by interoperating with the VM service provider 200. The marketplace security apparatus may be embodied via a computing device including one or more processors and a memory. Although the vendor authentication process in the flowchart is illustrated as a plurality of operations, at least some operations in the flowchart may be performed in a different order, may be performed with other operations in combination, may be omitted, may be performed in detailed steps, or may be performed with one or more additional steps which are not illustrated.

Referring to FIGS. 2A and 2B, a VM service provider 200 may request issuing of an authentication certificate from a certificate authority (CA) 300 in order to verify its identity in operation S210.

The CA 300 may identify the identity of the VM service provider 200, and may issue an authentication certificate to the VM service provider 200 in operation S220.

The VM service provider 200 may store, in a storage, the authentication certificate issued from the CA 300 in operation S230.

The VM service provider 200 may transmit, to the cloud service provider 100, a message (i.e., a vendor registration request message) for requesting registration of a vendor with the marketplace of the cloud service provider 100 in operation S240. In this instance, the request message may include the authentication certificate.

As another example, the VM service provider 200 may transmit the authentication certificate to the cloud service provider 100, independently from the vendor registration request message.

The cloud service provider 100 may verify the authentication certificate obtained from the VM service provider 200 in operation S250. In this instance, the cloud service provider 100 may store, in the storage, the authentication certificate obtained from the VM service provider 200.

In case that a result of the verification shows that the authentication certificate is successfully verified in operation S260, the cloud service provider 100 may transmit a message that grants the vendor registration request to the VM service provider 200 in operation S270. Subsequently, the cloud service provider 100 may register, with the marketplace, the VM service provider 200 as a vendor in operation S280.

In case that the result of the verification shows that the verification of the authentication certificate fails in operation S260, the cloud service provider 100 may transmit a message that rejects the vendor registration request to the VM service provider 200 in operation S290.

As described above, in case that the VM service provider requests registration of a vendor, the cloud service provider (CSP) according to an embodiment of the disclosure may effectively authenticate the corresponding VM service provider by using an authentication certificate received from the corresponding VM service provider.

Figure 3A:
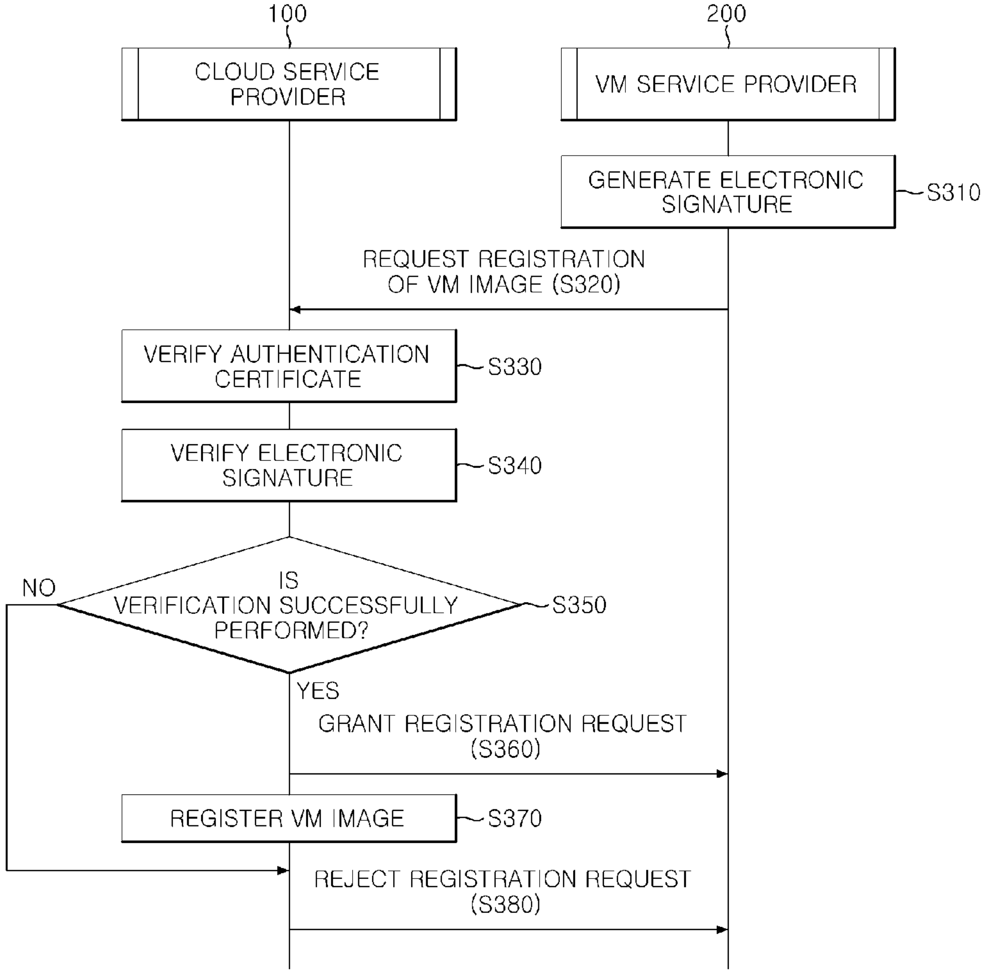
FIG. 3A is a flowchart illustrating a process of verifying a VM image obtained from a VM service provider in the case of registration of a VM image.
Figure 3B:
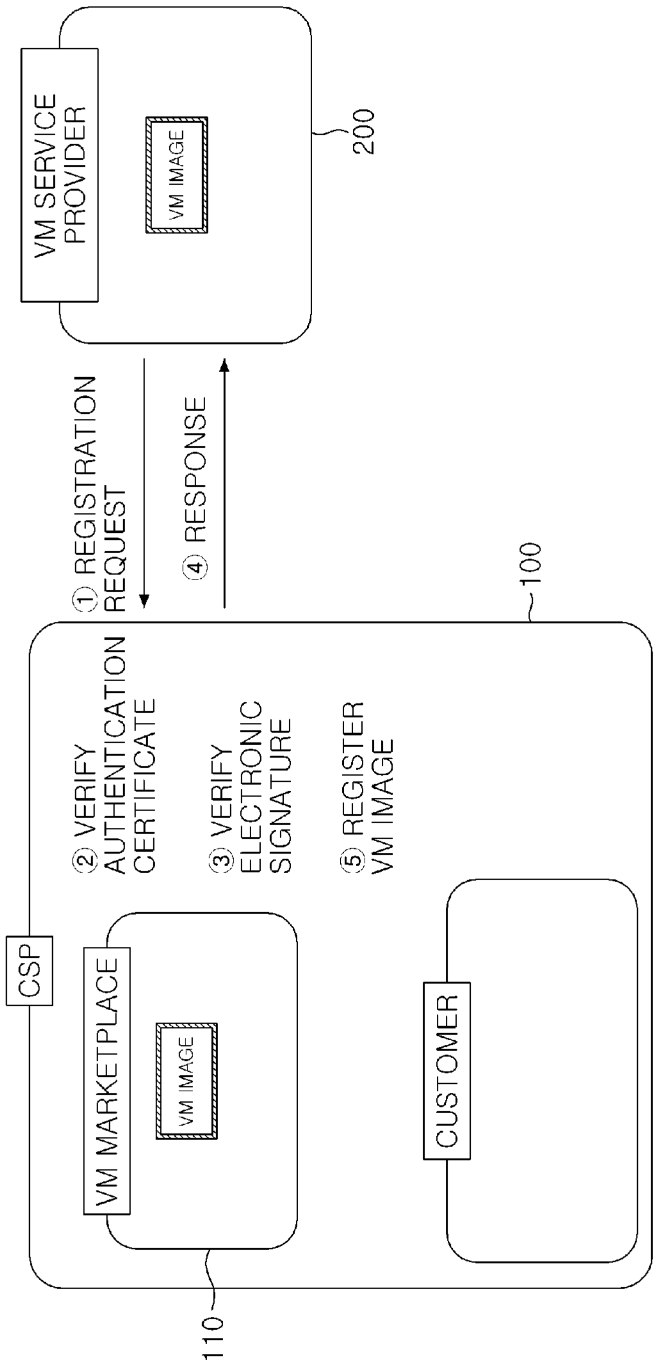
FIG. 3B is a diagram to which reference is made, in order to describe the verification process of FIG. 3A.

FIG. 3A is a flowchart illustrating a process of verifying a VM image obtained from a VM service provider in the case of registration of the VM image, and FIG. 3B is a diagram to which reference is made in order to describe the verification process of FIG. 3A. The VM image verification process according to the disclosure may be performed by a marketplace security apparatus in the cloud service provider 100. The marketplace security apparatus may operate by interoperating with the VM service provider 200. The marketplace security apparatus may be embodied via a computing device including one or more processors and a memory. Although the VM image verification process in the flowchart is illustrated as a plurality of operations, at least some operations in the flowchart may be performed in a different order, may be performed with other operations in combination, may be omitted, may be performed in detailed steps, or may be performed with one or more additional steps which are not illustrated.

Referring to FIGS. 3A and 3B, the VM service provider 200 may generate an electronic signature associated with a VM image to be registered with a marketplace of the cloud service provider 100 in operation S310. In this instance, the VM service provider 200 may generate an electronic signature by using a private key.

The VM service provider 200 may transmit, to the cloud service provider 100, a message (i.e., a VM image registration request message) for requesting registration of a VM image with the marketplace of the cloud service provider 100 in operation S320. In this instance, the request message may include at least one of a VM image, an authentication certificate, and an electronic signature.

As another example, the VM service provider 200 may transmit at least one of the VM image, the authentication certificate, and the electronic signature to the cloud service provider 100, independently from the VM image registration request message.

The cloud service provider 100 may store, in a storage, at least one of the VM image, the authentication certificate, and the electronic signature obtained from the VM service provider 200.

The cloud service provider 100 may verify the authentication certificate obtained from the VM service provider 200 in operation S330. Here, the authentication certificate may be an authentication certificate obtained from the VM service provider 200 in the VM image registration process or the vendor registration process. Depending on an embodiment of the disclosure, the corresponding operation may be configured to be omitted.

The cloud service provider 100 may verify the electronic signature obtained from the VM service provider 200 in operation S340. In this instance, the cloud service provider 100 may verify the electronic signature by using a public key.

In case that a result of the verification shows that both the authentication certificate and the electronic signature are successfully verified in operation S350, the cloud service provider 100 may transmit a message that grants the VM image registration request to the VM service provider 200 in operation S360.

By verifying the authentication certificate, the cloud service provider 100 may identify that the VM service provider 200 that provides a VM image is an authenticated vendor. In addition, the cloud service provider 100 may identify that a VM image provided by the VM service provider 200 is an original image by verifying the electronic signature.

In case that the verification is successfully performed, the cloud service provider 100 may register, with the marketplace 110, the VM image obtained from the VM service provider 200 in operation S370.

In case that the result of the verification shows that verification of at least one of the authentication certificate and the electronic signature fails in operation S350, the cloud service provider 100 may transmit a message that rejects the VM image registration request to the VM service provider 200 in operation S380.

As described above, the cloud service provider (CSP) according to an embodiment of the disclosure may identify whether the VM service provider that provides a VM image is an authenticated vendor by verifying an authenticated certificate obtained from the VM service provider in case that registration of a VM image is requested, and may identify whether the VM image provided from the VM service provider is forged/falsified by verifying an electronic signature obtained from the VM service provider.

Figure 4A:
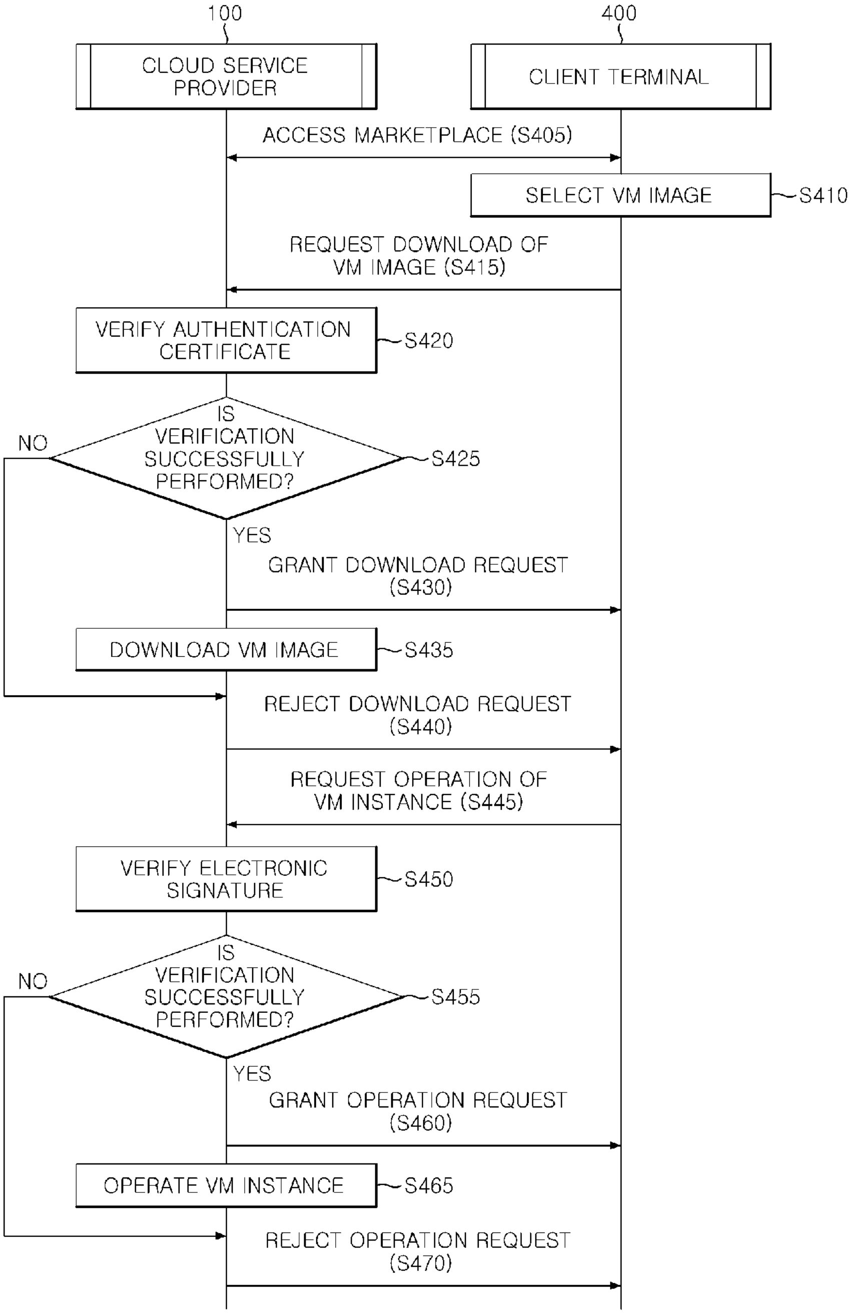
FIG. 4A is a flowchart illustrating a process of verifying a VM image downloaded from a marketplace in the case of operation of a VM instance.
Figure 4B:
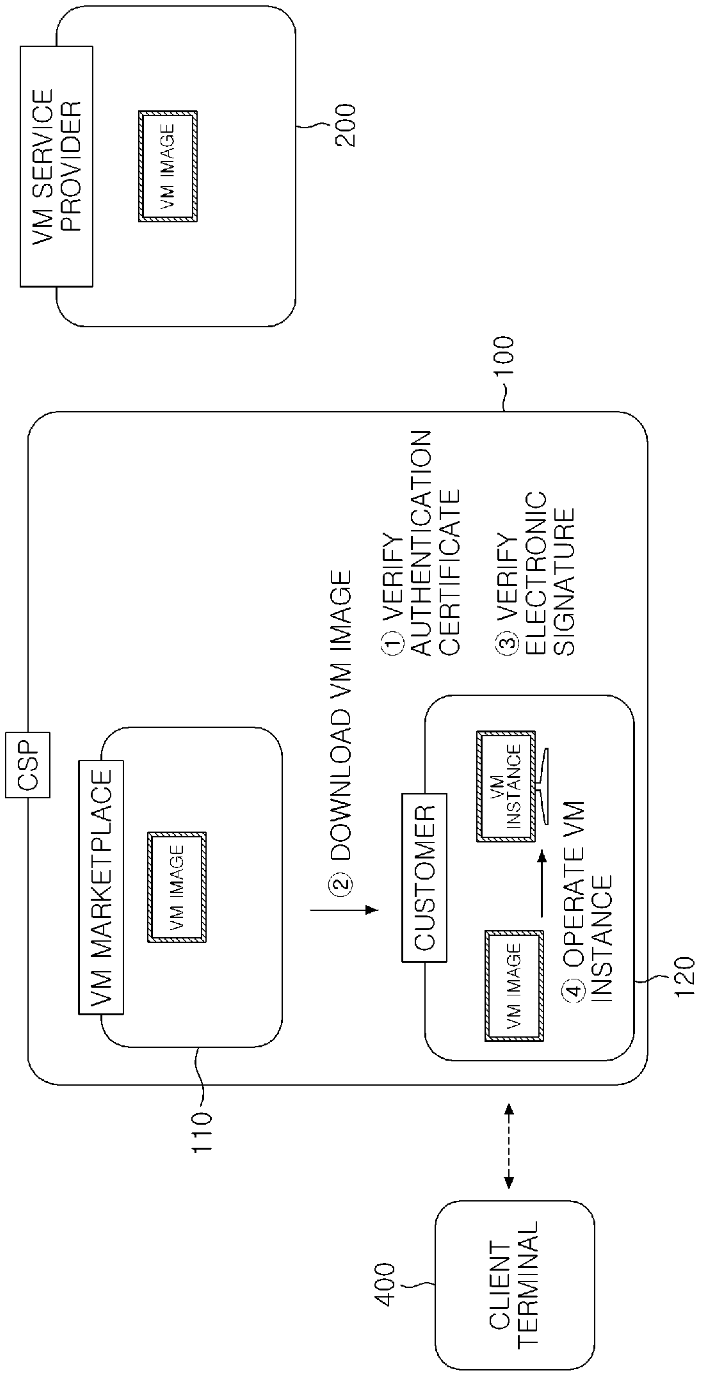
FIG. 4B is a diagram to which reference is made, in order to describe the verification process of FIG. 4A.

FIG. 4A is a flowchart illustrating a process of verifying a VM image downloaded from a marketplace in the case of operation of a VM instance, and FIG. 4B is a diagram to which reference is made in order to describe the verification process of FIG. 4A. The VM image verification process according to the embodiment may be performed by a marketplace security apparatus in the cloud service provider 100. The marketplace security apparatus may operate by interoperating with a client terminal 400. The marketplace security apparatus may be embodied via a computing device including one or more processors and a memory. Although the VM image verification process in the flowchart is illustrated as a plurality of operations, at least some operations in the flowchart may be performed in a different order, may be performed with other operations in combination, may be omitted, may be performed in detailed steps, or may be performed with one or more additional steps which are not illustrated.

Referring to FIGS. 4A and 4B, the client terminal 400 may access a marketplace of the cloud service provider 100 in response to an access command from a cloud service customer in operation S405. The cloud service customer may access the marketplace so as to identify a plurality of VM images registered with the corresponding marketplace, and may purchase a desired VM image.

In response to a select command from the cloud service customer, the client terminal 400 may select at least one of the plurality of VM images registered with the marketplace in operation S410.

In response to a request command from the cloud service customer, the client terminal 400 may transmit a message that requests downloading of the selected VM image (i.e., a download request message) to the cloud service provider 100 in operation S415.

In response to the download request message, the cloud service provider 100 may identify the VM service provider 200 that provides the VM image to be downloaded, and may detect an authentication certificate obtained from the identified VM service provider 200. Here, the authentication certificate may be an authentication certificate obtained from the VM service provider 200 in the vendor registration process or the VM image registration process, and may be stored in a storage of the cloud service provider 100.

In case that the corresponding authentication certificate is not present in the storage of the cloud service provider 100, the cloud service provider 100 may request the authentication certificate from the VM service provider 200.

The cloud service provider 100 may verify the authentication certificate obtained from the VM service provider 200 in operation S420.

In case that a result of the verification in operation 420 shows that the authentication certificate is successfully verified in operation S425, the cloud service provider 100 may transmit a message that grants the VM image download request to the client terminal 400 in operations S430.

By verifying the authentication certificate, the cloud service provider 100 may identify that the VM service provider 200 that provides a VM image is an authenticated vendor.

In case that the authentication certificate is successfully verified, the cloud service provider 100 may download the VM image selected by the cloud service customer to a cloud space 120 of the corresponding customer in operation S435.

In case that the result of the verification in operation 420 shows that verification of the authentication certificate fails in operation S425, the cloud service provider 100 may transmit a message that rejects the VM image download request to the VM service provider 200 in operation S440.

Depending on an embodiment of the disclosure, the authentication verification may be configured to be omitted. In this instance, the cloud service provider 100 may download the corresponding VM image from the marketplace 110 without a separate verification process.

In response to a request command from the cloud service customer, the client terminal 400 may transmit a message (i.e., an operation request message) that requests operation of a VM instance corresponding to the VM image downloaded from the marketplace 110 in operation S445.

In response to the operation request message, the cloud service provider 100 may identify the VM service provider 200 that provides the VM image to be operated, and may detect an electronic signature obtained from the identified VM service provider 200. Here, the electronic signature may be an electronic signature obtained from the VM service provider 200 in the VM image registration process, and may be stored in a storage of the cloud service provider 100.

In case that the electronic signature of the corresponding VM image is not present in the storage of the cloud service provider 100, the cloud service provider 100 may request the corresponding electronic signature from the VM service provider 200.

The cloud service provider 100 may verify the electronic signature obtained from the VM service provider 200 in operation S450. In this instance, the cloud service provider 100 may verify the electronic signature by using a public key.

In case that a result of the verification in operation 450 shows that the electronic signature is successfully verified in operation S455, the cloud service provider 100 may transmit a message that grants the VM instance operation request to the client terminal 400 in operations S460.

The cloud service provider 100 may identify that the VM image downloaded from the marketplace 110 is an original image by verifying the electronic signature.

In case that the electronic signature is successfully verified, the cloud service provider 100 may operate, in the cloud space 120 of the customer, the VM instance corresponding to the VM image downloaded from the marketplace 110 in operation S465.

In the case of operation of the VM instance, the cloud service provider 100 may allocate a trusted platform module (TPM) so as to verify whether the VM instance normally operates. Depending on an embodiment of the disclosure, the corresponding operation may be configured to be omitted.

In case that the result of the verification in operation 450 shows that the verification of the electronic signature fails in operation S455, the cloud service provider 100 may transmit a message that rejects the VM instance operation request to the client terminal 400 in operations S470.

As described above, in case that operation of a VM instance is requested, the cloud service provider (CSP) according to an embodiment of the disclosure may identify whether a VM service provider that provides a VM image is an authenticated vendor by verifying an authenticated certificate obtained from the VM service provider, and may identify whether the VM image downloaded from the marketplace is forged/falsified by verifying an electronic signature obtained from the VM service provider.

Figure 5:
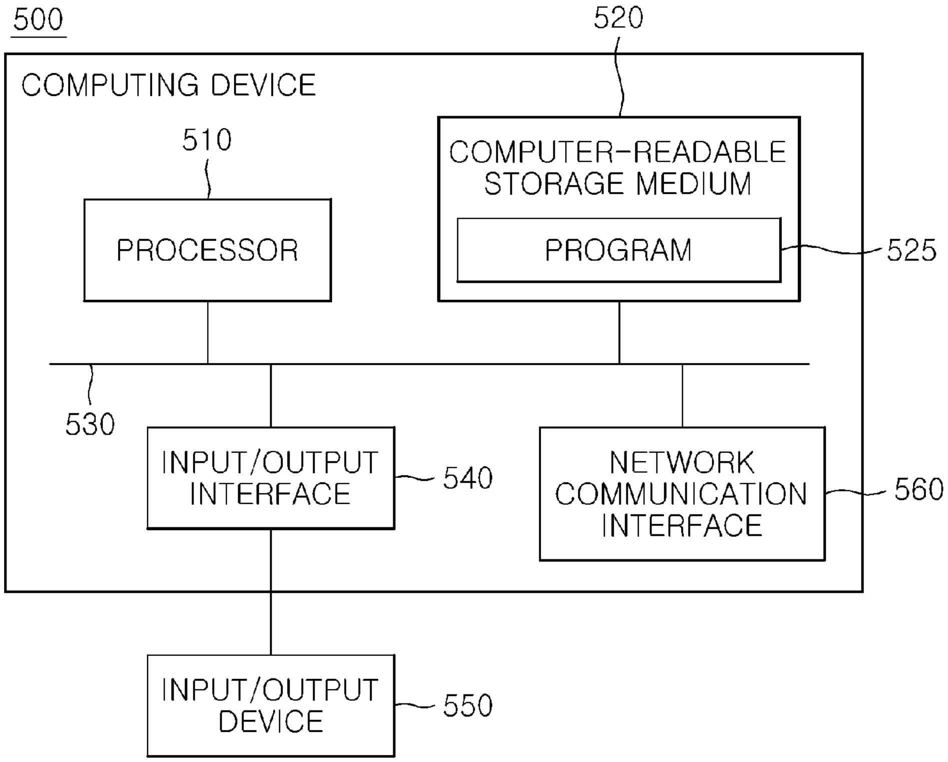
FIG. 5 is a block diagram illustrating the configuration of a computing device according to an embodiment of the disclosure.

FIG. 5 is a block diagram illustrating the configuration of a computing device according to an embodiment of the disclosure.

Referring to FIG. 5, a computing device 500 according to an embodiment of the disclosure may include at least one processor 510, a computer-readable storage medium 520, and a communication bus 530. The computing device 500 may be one or more components included in the above-described marketplace security apparatus or included in elements configured with the marketplace security apparatus.

The processor 510 may enable the computing device 500 to operate according to the above-described embodiment. For example, the processor 510 may implement one or more programs 525 stored in the computer-readable storage medium 520. The one or more programs may include one or more computer-executable instructions, and the computer-executable instructions may be configured to enable the computing device 500 to perform operations according to embodiments when the computer-executable instructions are executed by the processor 510.

The computer-readable storage medium 520 may be configured to store a computer-executable instruction or program code, program data, and/or other appropriate types of information. The program 525 stored in the computer-readable storage medium 520 may include a set of instructions executable by the processor 510. According to an embodiment, the computer-readable storage medium 520 may be memory (volatile memory such as random access memory, non-volatile memory, or an appropriate combination thereof), one or more magnetic disk storage devices, optical disk storage devices, flash memory devices, and other types of storage media capable of storing information desired or accessed by the computing device 500, or an appropriate combination thereof.

The communication bus 530 may include the processor 510 and the computer-readable storage medium 520, and may mutually connect various other components of the computing device 500.

The computing device 500 may include one or more input/output interfaces 540 that provide interfaces for one or more input/output devices 550, and one or more network communication interfaces 560. The input/output interface 540 and the network communication interface 560 may be connected to the communication bus 530.

The input/output device 550 may be connected to other components of the computing device 500 via the input/output interface 540. The illustrated input/output device 550 may include a pointing device (a mouse, a trackpad, or the like), a keyboard, a touch input device (a touch pad, a touch screen, or the like), a voice or sound input device, various types of sensor devices, and/or an input device such as a photographing device, and/or an output device such as a display device, a printer, a speaker, and/or a network card. The illustrated input/output device 550 may be included in the computing device 500 as one of the components included in the computing device 500, or may be connected to the computing device 500 as a separate device from the computing device 500.

As described above, the effect of the marketplace security method and the apparatus therefor according to embodiments of the disclosure are as follow.

According to at least one of the embodiments of the disclosure, the method and apparatus may identify whether a VM service provider that provides a VM image is an authenticated vendor by verifying an authenticated certificate obtained from the VM service provider in case that registration of a VM image is requested, and may identify whether the VM image provided from the VM service provider is forged/falsified by verifying an electronic signature obtained from the VM service provider, which are advantageous.

In addition, according to at least one of the embodiments of the disclosure, the method and apparatus may identify whether a VM service provider that provides a VM image is an authenticated vendor by verifying an authenticated certificate obtained from the VM service provider in case that a cloud service customer requests operation of a VM instance, and may identify whether the VM image downloaded from the marketplace is forged/falsified by verifying an electronic signature obtained from the VM service provider, which are advantageous.

Effects that could be obtained by the marketplace security method and the apparatus therefor according to the embodiments of the disclosure are not limited to the above-described effects, and based on the descriptions provided below, those skilled in the art could clearly understand other effects which are not mentioned.

The above-described disclosure may be implemented using computer-readable code in a medium in which a program is recorded. The computer-readable storage medium may continuously store a computer-executable program, or may temporarily store the same for execution or downloading. In addition, a storage medium may be one of the various types of recording devices or storage devices provided in a single entity or in a form in which a plurality of pieces of hardware are combined, and the storage medium is not limited to a medium that directly accesses a predetermined computer system, and may be distributed in a network. Examples of the medium may include a magnetic medium such as a hard disk, a floppy disk, and a magnetic tape, an optical recording medium such as CD-ROM and DVD, a magneto-optical medium such as a floptical disk or the like, and ROM, RAM, flash memory, and the like, which are configured to store program instructions. In addition, examples of another medium may include a recording medium or a storage medium managed by an app store that distributes applications, a site that supplies or distributes various types of software, a server, or the like. Therefore, the detailed description should not be construed restrictively in all aspects, and may be considered as an example. The scope of the disclosure should be determined by rational interpretation of attached claims, and all modifications made in the scope equivalent to that of the disclosure should be included in the scope of the disclosure.

What is claimed is:

1. A marketplace security method in a cloud service provider (CSP), the method comprising:

registering a virtual machine (VM) service provider with a marketplace of the cloud service provider as an authenticated vendor responsive to successfully verifying an authentication certificate received from the VM service provider during a vendor registration process, the authentication certificate issued from a certificate authority separate from the VM service provider and the cloud service provider;

receiving, from the VM service provider, a message for requesting registration of a VM image;

detecting the authentication certificate obtained from the VM service provider responsive to the request message;

verifying the detected authentication certificate to authenticate the VM service provider;

obtaining an electronic signature associated with the VM image from the VM service provider;

verifying the obtained electronic signature to determine whether the VM image is forged or falsified; and responsive to determining that:

(i) the VM service provider is authenticated based on the verification of the detected authentication certificate, and (ii) the VM image is not forged or falsified based on the verification of the obtained electronic signature, transmitting a message for granting a registration request of the VM image to the VM service provider and registering the VM image with the marketplace.

2. The method of claim 1, wherein the request message comprises at least one of the VM image, the authentication certificate, and the electronic signature.

3. The method of claim 1, further comprising identifying whether the VM service provider that provides the VM image is an authenticated vendor by verifying the authentication certificate.

4. A marketplace security apparatus comprising one or more processors and a memory, wherein the one or more processors are configured to:

register a virtual machine (VM) service provider with a marketplace of a cloud service provider as an authenticated vendor responsive to successfully verifying an authentication certificate received from the VM service provider during a vendor registration process, the authentication certificate issued from a certificate authority separate from the VM service provider and the cloud service provider;

receive, from the VM service provider, a message that requests registration of a VM image;

detect the authentication certificate obtained from the VM service provider responsive to the request message;

verify the detected authentication certificate to authenticate the VM service provider;

obtain an electronic signature associated with the VM image from the VM service provider;

verify the obtained electronic signature to determine whether the VM image is forged or falsified; and responsive to determining that:

(i) the VM service provider is authenticated based on the verification of the detected authentication certificate, and (ii) the VM image is not forged or falsified based on the verification of the obtained electronic signature, transmit a message for granting a registration request of the VM image to the VM service provider and register the VM image with the marketplace.

5. The apparatus of claim 4, wherein the request message comprises at least one of the VM image, the authentication certificate, and the electronic signature.

6. The apparatus of claim 4, wherein the one or more processors are configured to identify whether the VM service provider that provides the VM image is an authenticated vendor by verifying the authentication certificate.

7. A marketplace security method in a cloud service provider (CSP), the method comprising:

registering a virtual machine (VM) service provider with a marketplace of the cloud service provider as an authenticated vendor responsive to successfully verifying an authentication certificate received from the VM service provider during a vendor registration process, the authentication certificate issued from a certificate authority separate from the VM service provider and the cloud service provider;

registering one or more VM images provided by the VM service provider with the marketplace;

in response to receiving a request for downloading a VM image selected by a cloud service customer, identifying the VM service provider that provides the selected VM image;

detecting the authentication certificate obtained from the identified VM service provider;

verifying the detected authentication certificate to authenticate the identified VM service provider;

responsive to determining that the detected authentication certificate authenticates the identified VM service provider as the authenticated vendor, downloading the selected VM image from the marketplace into a cloud space of the cloud service customer;

obtaining an electronic signature associated with the downloaded VM image in response to an operation request of the cloud service customer;

verifying the obtained electronic signature to determine whether the downloaded VM image is forged or falsified;

responsive to determining that the downloaded VM image is not forged or falsified based on the verification of the obtained electronic signature, allowing operation of a VM instance corresponding to the downloaded VM image; and responsive to determining that the downloaded VM image is forged or falsified based on the verification of the obtained electronic signature, preventing operation of the VM instance corresponding to the downloaded VM image.

8. The method of claim 7, wherein the obtaining comprises obtaining the electronic signature from a storage of the cloud service provider or from a VM service provider that provides the VM image.

9. The method of claim 7, further comprising allocating a trusted platform module (TPM) and verifying whether the VM instance operates in a case of operating the VM instance.

10. A marketplace security apparatus including one or more processors and a memory, wherein the one or more processors are configured to:

register a virtual machine (VM) service provider with a marketplace of a cloud service provider as an authenticated vendor responsive to successfully verifying an authentication certificate received from the VM service provider during a vendor registration process, the authentication certificate issued from a certificate authority separate from the VM service provider and the cloud service provider;

register one or more VM images provided by the VM service provider with the marketplace;

in response to receiving a request for downloading a VM image selected by a cloud service customer, identify the VM service provider that provides the selected VM image;

detect the authentication certificate obtained from the identified VM service provider;

verify the detected authentication certificate to authenticate the identified VM service provider;

responsive to determining that the detected authentication certificate authenticates the identified VM service provider as the authenticated vendor, download the selected VM image from the marketplace to a cloud space of the cloud service customer;

obtain an electronic signature associated with the downloaded VM image in response to an operation request of the cloud service customer;

verify the obtained electronic signature to determine whether the downloaded VM image is forged or falsified;

responsive to determining that the downloaded VM image is not forged or falsified based on the verification of the obtained electronic signature, allow operations of a VM instance corresponding to the downloaded VM image; and responsive to determining that the downloaded VM image is forged or falsified based on the verification of obtained the electronic signature, prevent operation of the VM instance corresponding to the downloaded VM image.

11. The apparatus of claim 10, wherein the one or more processors are configured to obtain the electronic signature from a storage of a cloud service provider or from a VM service provider that provides the VM image.

12. The apparatus of claim 10, wherein the one or more processors are configured to further perform allocating of a trusted platform module (TPM) so as to verify of whether the VM instance operates in a case of operating the VM instance.

* * * * *